Figure 1:
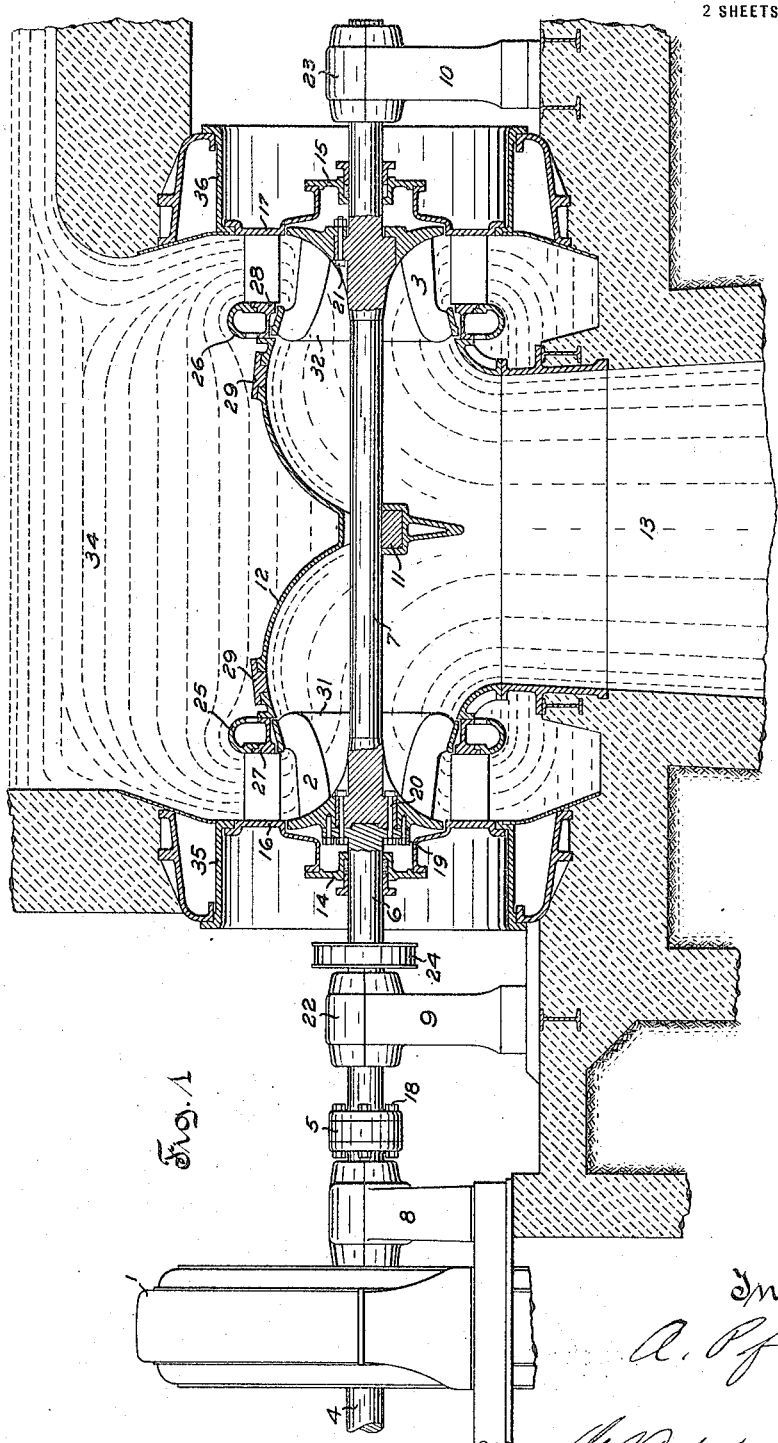

A. PFAU.
HYDRAULIC TURBINE.
APPLICATION FILED SEPT. 13, 1915.

1,193,183.

Patented Aug. 1, 1916.
2 SHEETS—SHEET 1.

Inventor
A. Pfau by *[signature]* Attorney

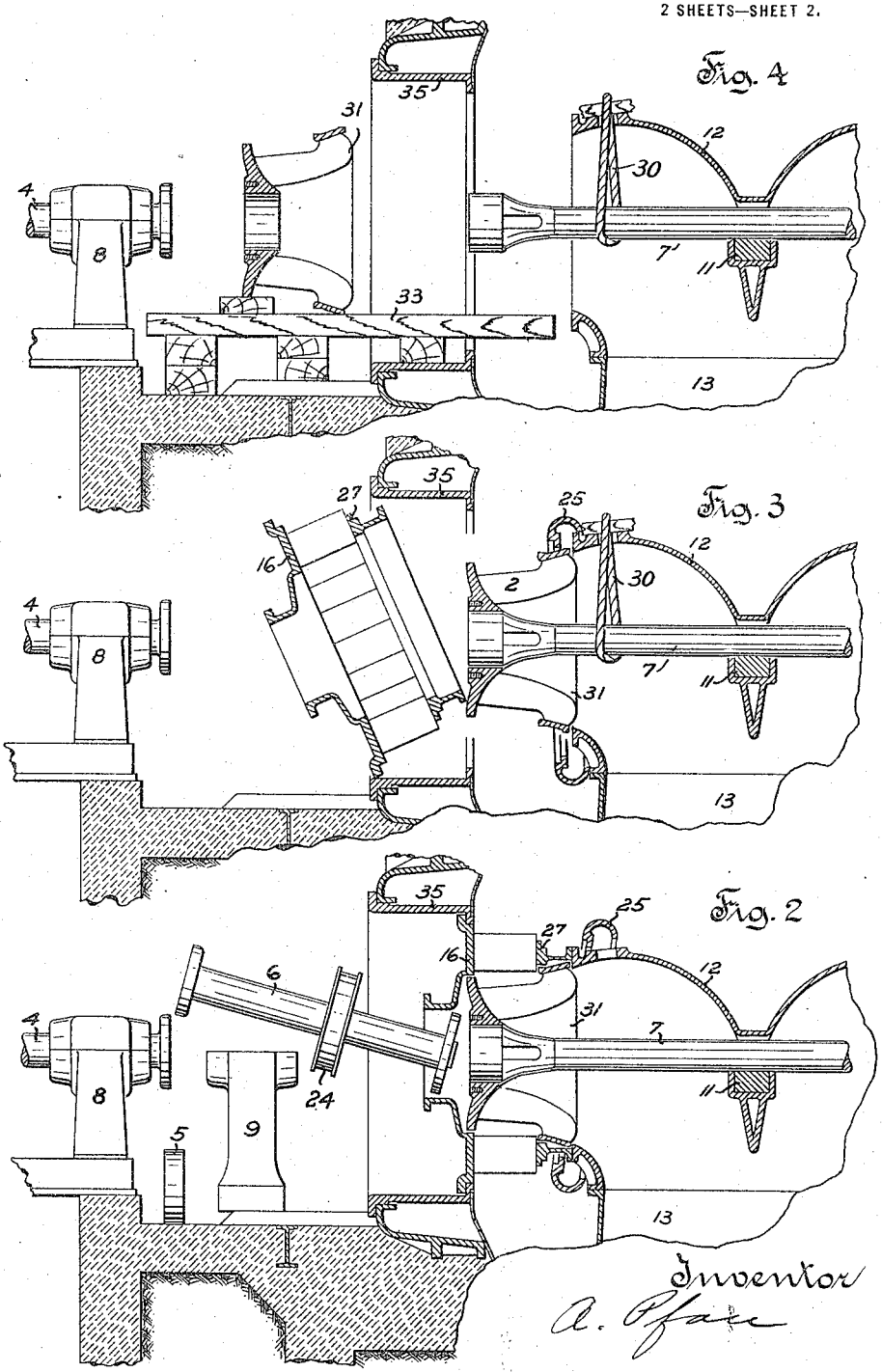

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

HYDRAULIC TURBINE.

1,193,183.      Specification of Letters Patent.      Patented Aug. 1, 1916.

Application filed September 13, 1915. Serial No. 50,915.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Hydraulic Turbines, of which the following is a specification.

This invention relates to improvements in the construction of energy translating installations and is particularly applicable to power plants of the hydro-electric type.

An object of the invention is to provide an energy translating installation which is simple in construction, efficient in operation, and which may be readily assembled and disassembled, especially in case repairs are found necessary.

One of the more specific objects is to provide an installation comprising an electric generator direct-coupled on one side to horizontal twin turbines, in which the intermediate turbine may be readily assembled or removed without disturbing either the generator or the end turbine.

In the prior construction of installations comprising a generator driven by twin turbines, and especially in those installations where both of the turbines were located on the same side of the generator, it has been necessary in order to remove the intermediate turbine, to either first or simultaneously remove the end turbine. With the use of the present invention the turbine adjacent the generator may be readily removed by first removing a section of the main shaft and later removing the turbine elements, without disturbing either the electric generator or the end turbine.

A clear conception of an embodiment of the invention may be had by referring to the drawings accompanying and forming a part of this specification, in which like reference characters designate the same or similar parts in the various views.

Figure 1 is a transverse vertical section through a hydro-electric installation comprising an electric generator direct connected to horizontal twin Francis turbines located at one side thereof. Fig. 2 is a fragmentary central vertical section through the same installation showing the method of removing the intermediate bearing and shaft section. Fig. 3 is a fragmentary central vertical section through the same installation showing the method of removing the guide casing of the turbine. Fig. 4 is a fragmentary central vertical section through the same installation showing the method of removing the intermediate turbine runner.

The hydro-electric installation herein disclosed comprises essentially an energy translating device or electric generator 1, an energy translating device or intermediate Francis turbine 2, and an energy translating device or Francis turbine 2. These three energy translating devices 1, 2, 3, are direct coupled or connected by means of a shaft comprising a generator shaft section 4, a removable shaft filling piece 5, an intermediate shaft section 6, and a main turbine shaft section 7. The generator shaft section 4 is supported in bearings 8, only one of which is shown. The intermediate shaft section 6 is supported in an intermediate turbine bearing 9. The main turbine shaft section 7 is supported in an end turbine bearing 10 and an intermediate turbine shaft support 11.

The intermediate turbine 2 comprises a turbine runner 31 having a peripheral intake connected with a pen stock 34 through the usual turbine guide casing 27. The end turbine 3 comprises a turbine runner 32 having a peripheral intake connected with the pen stock 34 through a turbine guide casing 28. The turbines 2, 3, have their discharge ends connected with a common turbine draft tube 13 by means of a turbine discharge casing 12.

The end runner 32 is connected directly to the turbine shaft section 7 by means of through bolts 21. The intermediate runner 31 is connected directly to a flange at the end of the intermediate shaft section 6 by means of tap bolts 19. The intermediate shaft section 6 is connected to the turbine shaft section 7 by means of the through bolts 20. If so desired, the bolts 19, 20, 21, may be relieved of shearing stresses by the insertion of suitable dowels in alined openings formed in the connected elements, these dowels having been omitted from the present disclosure as they form no part of the present invention.

The turbine split covers 16, 17, form parts of the guide casings 27, 28, respectively, and have their peripheries secured to the turbine flume rings 35, 36, respectively, being provided at their portions adjacent the main shaft with removable packing glands 14, 15, respectively. Each of the turbines 2, 3, is provided with a guide vane shifting ring 25, 26, respectively, which rings are normally shiftably mounted upon the adjacent guide casings 27, 28. The turbine discharge casing 12 is provided adjacent the rings 25, 26, with suitable manhole covers 29 for permitting access to the interior of the discharge casing.

The intermediate shaft section 6 is provided at a point adjacent the intermediate bearing 9 with a split governor pulley 24. The removable collar or filling piece 5 is clamped between flanges formed at the ends of the shaft sections 4, 6, by means of coupling through bolts 18. The turbine bearings 9, 10, are provided with removable caps 22, 23, respectively.

Assuming the turbines to have been assembled as disclosed in Fig. 1, if it is desired to remove the intermediate turbine 2, the water must first be drained from the pen stock 34. After the water has been thus removed, the coupling through the bolts 18 and the bolts 19, 20, together with the packing gland 14 and the bearing cap 22, are removed. The governor pulley 24 may also be removed if so desired. After these elements have been removed, the filling piece 5 and bearing 9 are shifted to the position indicated in Fig. 2. The intermediate shaft section 6 may then be withdrawn as indicated in this figure. The manhole cover 29 adjacent the intermediate turbine 2 is then removed and the guide vane shifting ring 25 is removed from the casing 27 and is temporarily positioned as shown in Fig. 2. The runner 31 and shaft section 7 are then supported by means of a rope 30 passed through the manhole and suitably suspended from a block, as shown in Fig. 3. The cover 16 and guide casing 27 are then removed, as shown in Fig. 3, by sliding the same along the flume ring 35, after which the shifting ring 25 is readily removable over the runner 31. After the cover 16, ring 25, and casing 27 have been removed, a scaffold 33, as shown in Fig. 4, is provided and the runner 31 may be readily removed as indicated. In order to assemble the intermediate turbine 2, the reversal of the disassembling steps is necessary. It will thus be seen that either the electric generator 1, the intermediate turbine 2, or the end turbine 3, may be readily removed without disturbing the position of any of the other energy translating devices. The generator 1 may be readily removed by removing the bolts 18. The turbine runner 3 may be readily removed by removing the bolts 21, the bearing 10, bearing cap 23, split ring 17, and casing 28.

While the invention has been disclosed as applied to a hydro-electric installation having turbines of the Francis type, it should be understood that the invention is also readily applicable to other types of energy translating installations.

It should be understood that it is not desired to be limited to the exact details of construction herein shown and described, for obvious modifications will occur to a person skilled in the art.

It is claimed and desired to secure by Letters Patent,—

1. In combination, an energy absorber, a plurality of prime movers connected to said absorber and located on the same side thereof, and means for permitting removal of any of said prime movers without disturbing others.

2. In combination, an electric machine, a plurality of rotary elements connected to said machine and located on the same side thereof, and means for permitting removal of any of said rotary elements without disturbing others.

3. In combination, an energy translating device, a plurality of hydraulic machines connected to said device and located on the same side thereof, and means for permitting removal of any of said machines without disturbing others.

4. In combination, an electric generator, a plurality of Francis turbines connected to said generator and located on the same side thereof, and means for permitting removal of any one of said turbines without disturbing others.

5. In combination, an energy translating device, a hydraulic machine connected thereto, a second hydraulic machine intermediate said device and said first hydraulic machine, and means for permitting removal of said second hydraulic machine without disturbing said device or said first hydraulic machine.

6. In combination, at least three direct connected energy translating devices, and means for permitting removal of an intermediate device without disturbing the position of the others.

7. In combination, an energy absorber, a plurality of prime movers located on the same side of said energy absorber, and a driving connection between said prime movers and said absorber, said connection permitting removal of any of said prime movers without disturbing others.

8. In combination, an electric generator, a plurality of Francis turbines located on the same side of said generator, and a driving connection between said turbines and said generator, said connection permitting removal of any one of said turbines without disturbing others.

9. In combination, a plurality of prime movers, and an energy absorber operatively connected to said prime movers, said prime movers being located on the same side of said absorber and the connection permitting removal of any of said prime movers without disturbing others.

10. In combination, an electric generator, a plurality of Francis turbines located on the same side of said generator, and a shaft connecting said turbines to said generator, said shaft having a removable portion for permitting removal of any of said turbines without disturbing others.

In testimony whereof, the signature of the inventor is affixed hereto.

ARNOLD PFAU.

Copies of this patent may be obtained for five cents each, by addressing the "Commissioner of Patents, Washington, D. C."